US006622184B1

United States Patent
Tabe et al.

(10) Patent No.: US 6,622,184 B1
(45) Date of Patent: Sep. 16, 2003

(54) INFORMATION PROCESSING SYSTEM (75) Inventors: Tetsuya Tabe, Ebina (JP); Eiichi Asai, Fujisawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 492 days.

(21) Appl. No.: 09/585,351

(22) Filed: Jun. 2, 2000

(30) Foreign Application Priority Data

Jun. 4, 1999 (JP) ............................................ 11-158256

(51) Int. Cl.[7] ................................................. G06F 3/02
(52) U.S. Cl. ........................... 710/36; 710/41; 710/108; 713/202; 714/25; 714/38
(58) Field of Search .............................. 710/1, 108, 36, 710/59, 73, 38, 40, 41, 107; 714/30, 38, 9, 25, 35, 36, 47; 713/200, 201, 202

(56) References Cited

U.S. PATENT DOCUMENTS

| | | | | |
|---|---|---|---|---|
| 5,293,610 A | | 3/1994 | Schwarz | |
| 5,530,804 A | * | 6/1996 | Edginton et al. | 714/30 |
| 5,615,331 A | * | 3/1997 | Toorians | 714/9 |
| 5,737,424 A | * | 4/1998 | Elteto et al. | 380/28 |
| 5,815,714 A | * | 9/1998 | Shridhar et al. | 395/704 |
| 5,828,824 A | * | 10/1998 | Swoboda | 714/25 |
| 5,978,937 A | * | 11/1999 | Miyamori et al. | 714/45 |
| 6,412,106 B1 | * | 6/2002 | Leask et al. | 717/124 |

* cited by examiner

Primary Examiner—Jeffrey Gaffin
Assistant Examiner—Rijue Mai
(74) Attorney, Agent, or Firm—Oblon, Spivak, McClelland, Maier & Neustadt, P.C.

(57) ABSTRACT

An information processing system which makes it possible to protect information stored in the ROM of the system from unauthorized access by means of a debug tool. The information processing system includes a ROM for storing an unlocking program and a user program; a CPU for executing said unlocking program and said user program stored in said ROM; an on-chip debug circuit serving to output debug information of said user program as executed by said information processing system; and a debug function disabling circuit serving to disable debug functions of said on-chip debug circuit at power up and to enable the debug functions of said on-chip debug circuit when said unlocking program has been executed.

16 Claims, 6 Drawing Sheets

INFORMATION PROCESSING SYSTEM

CROSS REFERENCE TO THE RELATED APPLICATION

The subject application is related to subject matter disclosed in the Japanese Patent Application No. Hei11-158256 filed in Jun. 4, 1999 in Japan, to which the subject application claims priority under the Paris Convention and which is incorporated by reference herein.

BACKGROUND OF THE INVENTION

1. Field of the Invention

The present invention is related to an improved information processing system which makes it possible to protect information stored in the ROM of the system from unauthorized access by means of a debug tool.

2. Description of the Related Art

Figure 1:
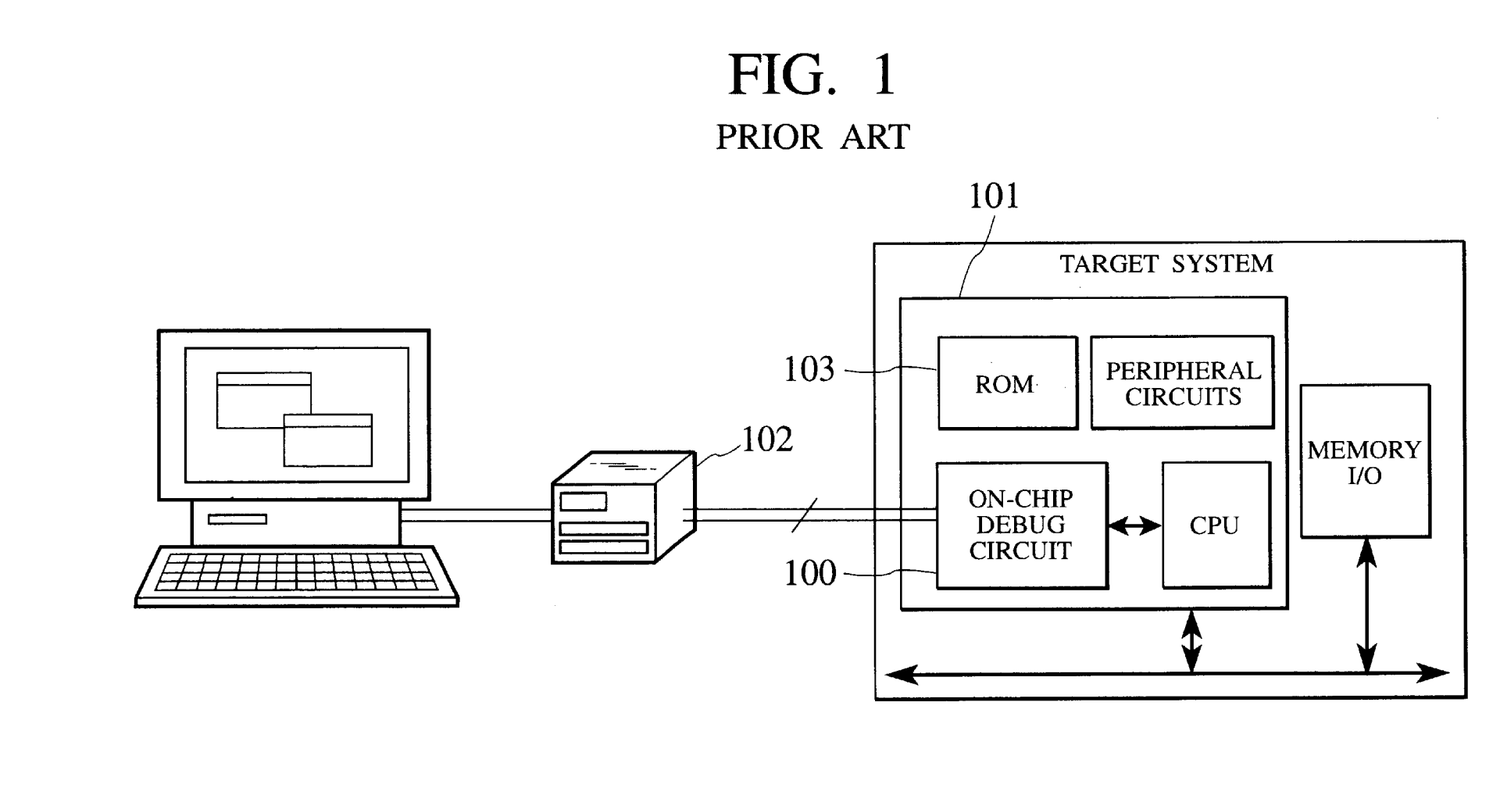
FIG. 1 is an information processing system in accordance with a prior art technique provided with a microcomputer in which an on-chip debug circuit is embedded for debug operation.

FIG. 1 is an information processing system in accordance with a prior art technique provided with a microcomputer 101 in which an on-chip debug circuit 100 is embedded. The on-chip debug circuit 100 serves to make it possible to use several emulation functions such as performing single instruction step, stop on compare, break points, tracing and so forth by connecting an external on-chip debug ICE (In-Circuit Emulator) 102. By this configuration, it is possible to analyze the execution of a target program and the behavior of the microcomputer 101 for the purpose of improving the software development environment, the debug process, repairing process and so forth.

However, the information stored in a built-in ROM 103 of the microcomputer 101 can be easily read by means of the on-chip debug ICE 102. It is therefore possible to analyze and refer to the information inside of the system of the microcomputer 101 by unauthorized persons. Because of this, it is difficult to protect the information of the system from reverse engineering/decompilation by unauthorized persons.

SUMMARY OF THE INVENTION

The present invention has been made in order to solve the shortcomings as described above. It is an important object of the present invention to provide an information processing system which makes it possible to protect information stored in the ROM of the system from unauthorized access by means of a debug tool.

In brief, the above and other objects and advantages of the present invention are provided by a new and improved information processing system comprising: a ROM for storing an unlocking program and a user program; a CPU for executing said unlocking program and said user program stored in said ROM; an on-chip debug circuit serving to output debug information of said user program as executed by said information processing system; and a debug function disabling circuit serving to disable debug functions of said on-chip debug circuit at power up and to enable the debug functions of said on-chip debug circuit when said unlocking program has been executed.

In a preferred embodiment, further improvement resides in that said debug function disabling circuit is controlled by a register for controlling the security of the information processing system.

In a preferred embodiment, further improvement resides in that said register for controlling the security is set and reset by executing input/output instructions of said CPU.

In a preferred embodiment, further improvement resides in that, when said register for controlling the security is set, said on-chip debug circuit is maintained disabled until an enable code is loaded to the clear register.

In a preferred embodiment, further improvement resides in that said debug function disabling circuit serves to disable part of the debug function(s) and enable the remaining debug function(s) at power up.

In a preferred embodiment, further improvement resides in that said debug function disabling circuit serves to disable a debug function for accessing a memory at power up.

In a preferred embodiment, further improvement resides in that said debug function disabling circuit serves to enable a debug function for performing break points.

In a preferred embodiment, further improvement resides in that, when a predetermined registration code is compared with a password as inputted to the system and confirmed the agreement therewith by said unlocking program, said debug function disabling circuit enables the function of the on-chip debug circuit.

In accordance with a further aspect of the present invention, the improvement resides in an information processing system comprising: a ROM for storing a user program; a CPU for executing said user program stored in said ROM; an on-chip debug circuit serving to output debug information of said user program as executed by said information processing system; and a debug function disabling circuit serving to disable debug functions of said on-chip debug circuit at power up and to enable the debug functions of said on-chip debug circuit by authorization using a password.

In a preferred embodiment, further improvement resides in that the authorization using a password is performed by hardwired control.

In a preferred embodiment, further improvement resides in that the authorization using a password is performed by an unlocking program stored in said ROM.

In accordance with a further aspect of the present invention, the improvement resides in an information processing system comprising: a ROM for storing a user program; a CPU for executing said user program stored in said ROM; an on-chip debug circuit serving to encrypt and output debug information of said user program as executed by said information processing system; and a debug function disabling circuit serving to disable debug functions of said on-chip debug circuit at power up and to enable the debug functions of said on-chip debug circuit by authorization using a password.

In a preferred embodiment, further improvement resides in that said on-chip debug circuit serves to decrypt a debug control signal as given from an external on-chip debug ICE.

BRIEF DESCRIPTION OF DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DETAILED DESCRIPTION OF EMBODIMENTS

Several examples of preferred embodiments of the present invention will be explained in details with reference to the drawings in the followings.

Figure 2:
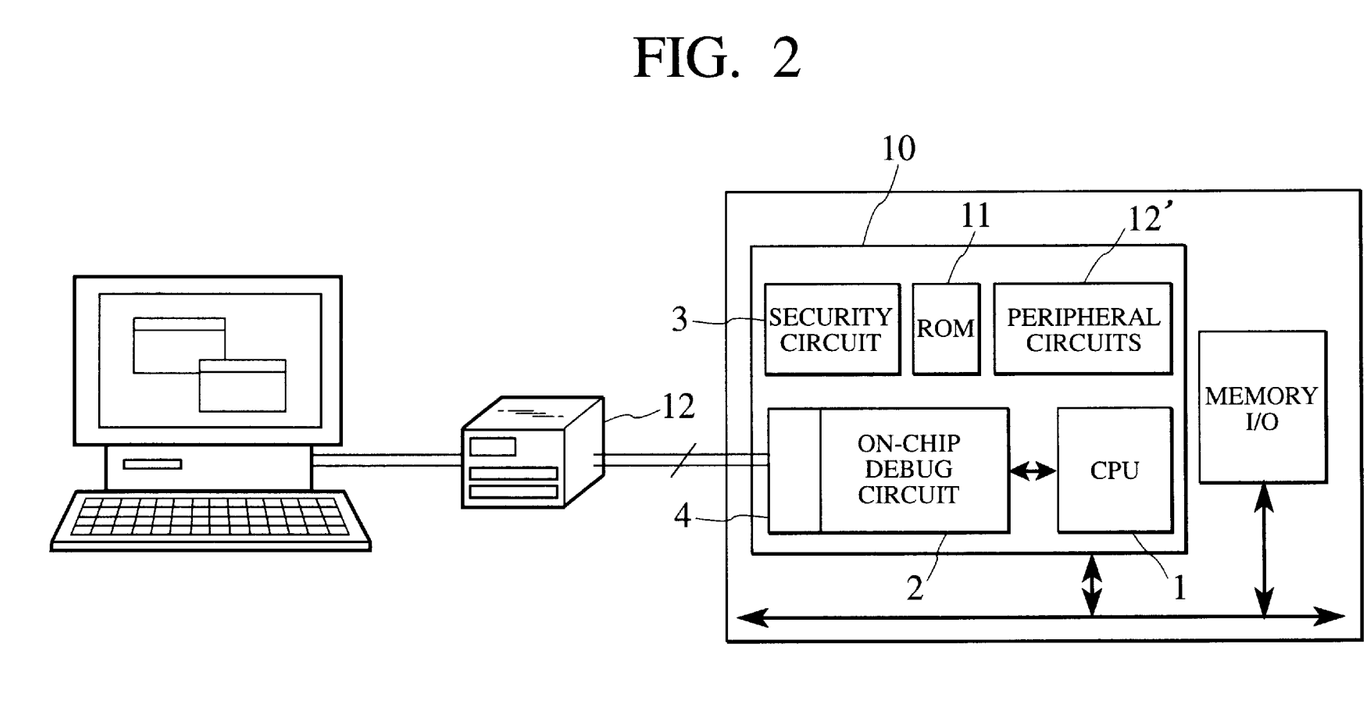
FIG. 2 is a general overview of an information processing system in accordance with a first embodiment of the present invention.
Figure 3:
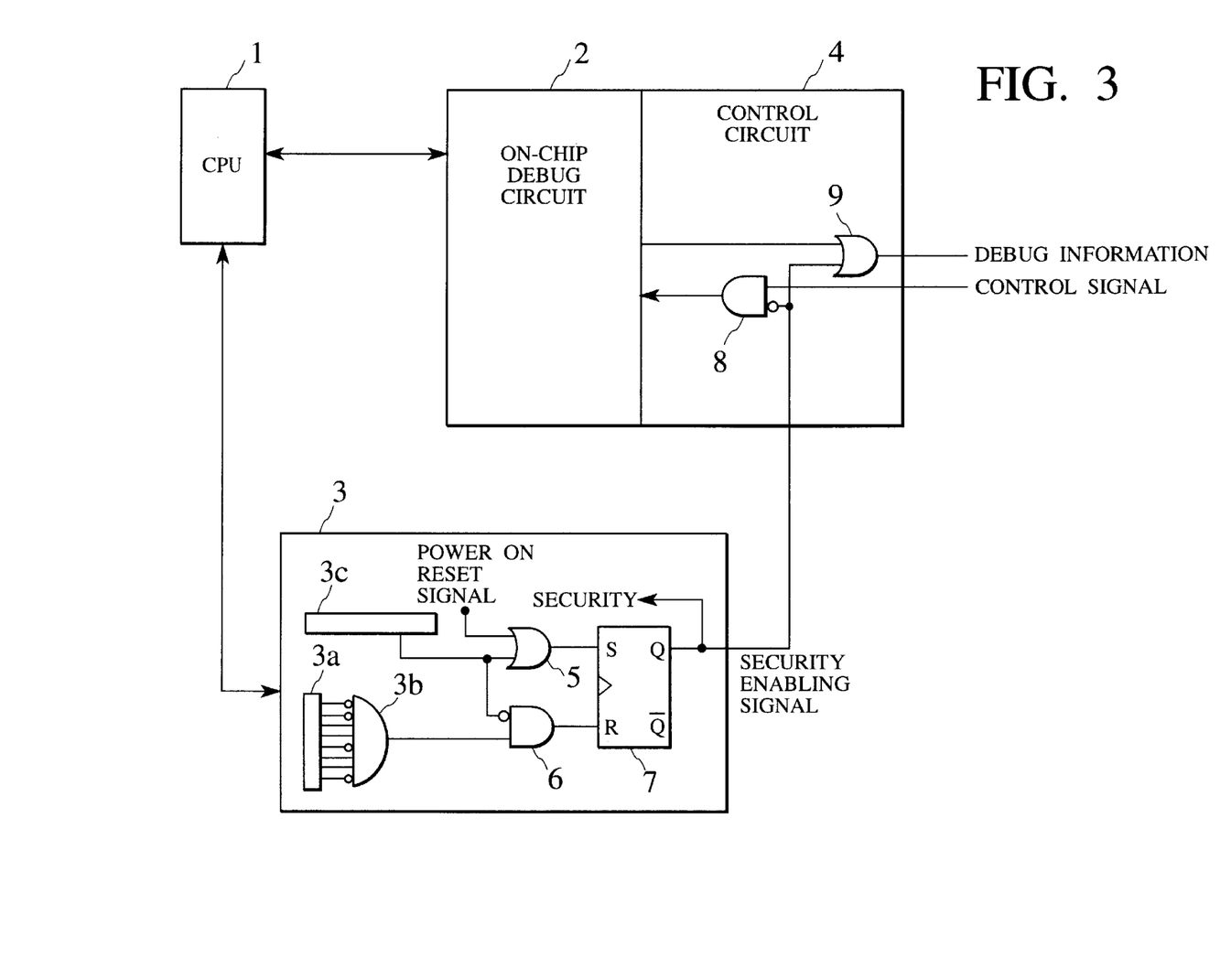
FIG. 3 is a schematic diagram for illustrating the major constituent elements of the information processing system in accordance with the first embodiment of the present invention.
Figure 4:
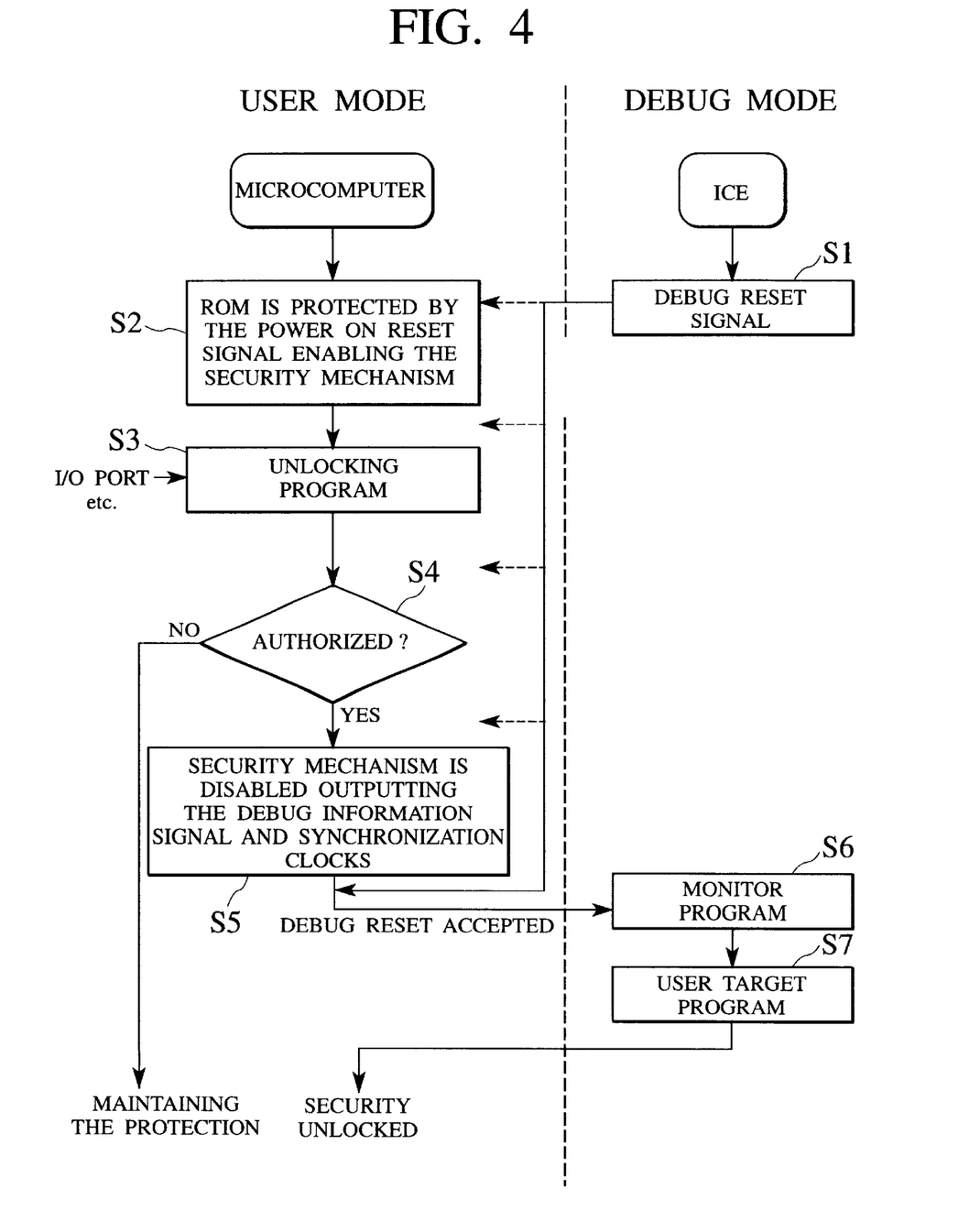
FIG. 4 is a flowchart showing the procedure of performing debugging for the information processing system as illustrated in FIG. 3 in accordance with the first embodiment of the present invention.

FIG. 2 is a general overview of an information processing system in accordance with a first embodiment of the present invention. FIG. 3 is a schematic diagram for illustrating the major constituent elements of the information processing system in accordance with the present invention. Also, FIG. 4 is a flowchart showing the procedure of performing debugging for the information processing system as illustrated in FIG. 3.

In FIG. 2, the information processing system in accordance with the present invention is composed of a microcomputer 10 comprising a CPU 1, an on-chip debug circuit 2, a security circuit 3, a control circuit 4, a ROM 11 and other necessary peripheral circuits 12'. Also, the microcomputer 10 can be connected to a host computer through an on-chip debug ICE 12 in order to conduct debug operation.

The security circuit 3 is composed of a logic sum (OR) gate 5 receiving a power-on reset signal for resetting the microcomputer at power up and a security bit signal, a logic product (AND) gate 6 receiving the inversion of the security bit signal and a debug enabling signal for enabling the reset operation of the security bit signal and a register (RS flip-flop) 7 for receiving the output of the logic OR gate 5 as a SET input signal (S) and the output of the AND gate circuit 6 as a RESET input signal (R) and outputting a security signal as an output signal Q. The debug enabling signal is output from a gate 3b connected to a security clear register 3a as a user I/O register and becomes active only when a predetermined enable code is loaded to the security clear register. The security clear register can be set or reset by executing input/output instructions of the CPU 1. The security bit is one bit of an input/output register, referred to as a security register 3c, which can be set or reset by executing input/output instructions of the CPU 1. By this configuration, the security circuit 3 serves to disable the function of the on-chip debug circuit 2 in order to enable the security mechanism by inhibiting the operation of reading any data stored in memories, particularly in the ROM 11 by means of the on-chip debug ICE 12, and to enable the function of the on-chip debug circuit 2 by disabling the security mechanism when receiving the security bit signal as reset and the debug enabling signal as activated.

The control circuit 4 is composed of an AND gate circuit 8 for receiving the inversion of a security signal as given from the security circuit 3 and a debug control signal which is given from the on-chip debug ICE 12 and required for debugging the microcomputer, and a logic OR gate 9 for receiving the security signal and the result of the debugging operation as given from the on-chip debug circuit 2 and outputting a debug information signal. In the case that the security signal is given from the security circuit 3 to enable the security mechanism, the on-chip debug ICE 12 is inhibited from outputting the debug information and receiving the debug control signal.

Next, in the case of this embodiment, the operation of the on-chip debug circuit 2 is controlled as explained in the following description.

The security bit has been provided in an I/O register located within the security circuit 3. The security bit is set as "1" to enable the security mechanism at power up so that the on-chip debug circuit 2 is disabled when initialized or reset just after the power up. The control circuit 4 serves therefore to disable by this process the debug control signals such as a debug reset signal, a debug interrupt signal, a debugging program data signal as input from the on-chip debug ICE 12 connected to the on-chip debug circuit 2 through the control circuit 4. While only a single debug control signal is illustrated in FIG. 3, there are provided a plurality of bits of the debug control signals so that a plurality of AND gate circuits 8 are provided for the same purpose. On the other hand, the control circuit 4 serves to disable the debug information signal, a synchronization clock signal and so forth as output from the on-chip debug circuit 2 to the on-chip debug ICE 12 by fixing output signals to a constant level. While only a single debug information signal is illustrated in FIG. 3, there are provided a plurality of bits of the debug information signals so that a plurality of logic OR gates 9 are provided for the same purpose.

It is performed by an unlocking program to disable the security mechanism. The unlocking program is a user program which has been prepared and stored in the ROM 11 by the user. By the unlocking program, the security bit is cleared to be "0" (inactive) while the security enabling code is loaded to the security clear register 3a. The procedure of invoking the unlocking program is designed in accordance with the configuration of the target system of the user. For example, when the initialization process of the system detects a predetermined manipulation of an input device available in the system, such as a switch, the initialization process transfers control to the unlocking program. It is therefore possible to furthermore ensure the security by keeping secret the procedure itself of invoking the unlocking program while a password may be required by the unlocking program to more enhance the security. Also with reference to the hardwired control, the security mechanism is locked by the security register and the security clear register. In this manner, the security mechanism is disabled when the security clear register and the security bit are controlled so that unexpected unlocking of the security mechanism due to a runaway of a program can be effectively avoided.

The status of ON/OFF of the security mechanism is detected by the following process. Namely, the ON status of the security mechanism is detected by reading "1" as the security bit. The debug information signals output from the on-chip debug circuit 2 to the on-chip debug ICE 12 are maintained to a common fixed level. The OFF status of the security mechanism (i.e., being unlocked) is detected by reading "0" as the security bit. Also, in the OFF status of the security mechanism, the on-chip debug circuit 2 serves to output the debug information signal to the on-chip debug ICE 12 together with synchronization clocks for making the operation of the on-chip debug ICE 12 synchronized with the on-chip debug circuit 2.

The on-chip debug ICE 12 can not be used until the security mechanism is released. Namely, as long as the security mechanism is active, the on-chip debug circuit 2 has no action in response to the signals such as the debug reset signal, the break signal output from the on-chip debug ICE 12. In the same time, the debug information signals output from the on-chip debug circuit 2 to the on-chip debug ICE 12 are maintained to a common fixed level. The security mechanism becomes active only when the system is powered up. Once the security mechanism is disabled, the security mechanism is not activated again even by the user reset operation or the reset operation by the on-chip debug ICE 12.

Next, FIG. 4 is an exemplary flowchart for explaining how a user makes use of the microcomputer implemented with the on-chip debug circuit 2 as described above.

The user connects the on-chip debug ICE 12 to the microcomputer in advance for the purpose of developing a program or maintenance thereof. When powering on the target system with the microcomputer and the on-chip debug ICE 12, the on-chip debug ICE 12 outputs the debug reset signal to the microcomputer in the step S1. However, since the on-chip debug circuit 2 is disabled by the power on reset signal, there is no response to the request in the step S2. On the other hand, since the debug information signals are fixed, the on-chip debug ICE 12 halts its operation or outputs an error message.

Next, if the user is an authorized user, he can invoke the unlocking program. The unlocking program is used to judge whether or not the user is authorized, e.g., requesting a password and so forth in the step S3. If the security mechanism is allowed to be disabled, the security register 3c of the microcomputer is accessed by the unlocking program, which is also a user program, to make the on-chip debug circuit 2 enabled. The judgment procedure may be implemented to detect the status of switches of the target system, the input signals from an external device and so forth, for judging whether or not the user is authorized, in place of explicitly requesting a password. In the step S5, the on-chip debug circuit 2 serves then to output the debug information signal together with the synchronization clocks for making the operation of the on-chip debug ICE 12 synchronized with the on-chip debug circuit 2 as illustrated in FIG. 3.

On the other hand, the debug reset signal is generated in response to the reset signal from the on-chip debug ICE 12. By this configuration, the operation of the on-chip debug ICE 12 becomes possible and therefore the monitor program for debugging is invoked followed by invoking the user program to be debugged. Thereafter, even if the system is reset, the security mechanism is maintained disabled to make possible to continue the on-chip debug process. The on-chip debug ICE 12 can be used as long as the system is maintained powered on.

Next, the operation of the system will be explained in the case that the user is not an authorized user. He connects the on-chip debug ICE 12 to the microcomputer for an authorized purpose. When powering on the target system with the microcomputer and the on-chip debug ICE 12, the on-chip debug ICE 12 outputs the debug reset signal to the microcomputer in the step S1. However, since the on-chip debug circuit 2 is disabled by the power on reset signal, there is no response to the request in the step S2.

The user may invoke the target program while the security mechanism is maintained ON. However, he does not know how to invoke the unlocking program as implemented (or even if he can invoke, the unlocking program judges he is not an authorized user by the authorization judgment routine of the unlocking program), so that he fails to unlock the security. Accordingly, even if the target program is executed, the on-chip debug ICE 12 is maintained halted or simply outputting an error indication.

In this manner, in accordance with the embodiment as described above, the program information stored in the ROM 11 of the microcomputer can not be read by an authorized person. The unlocking program is freely written by the user in a variety of manners so that the confidentiality of the information becomes high. Furthermore, the security mechanism is turned on only by the power on reset signal so that the on-chip debug ICE 12 can be continuously utilized until the microcomputer is powered off.

Figure 5:
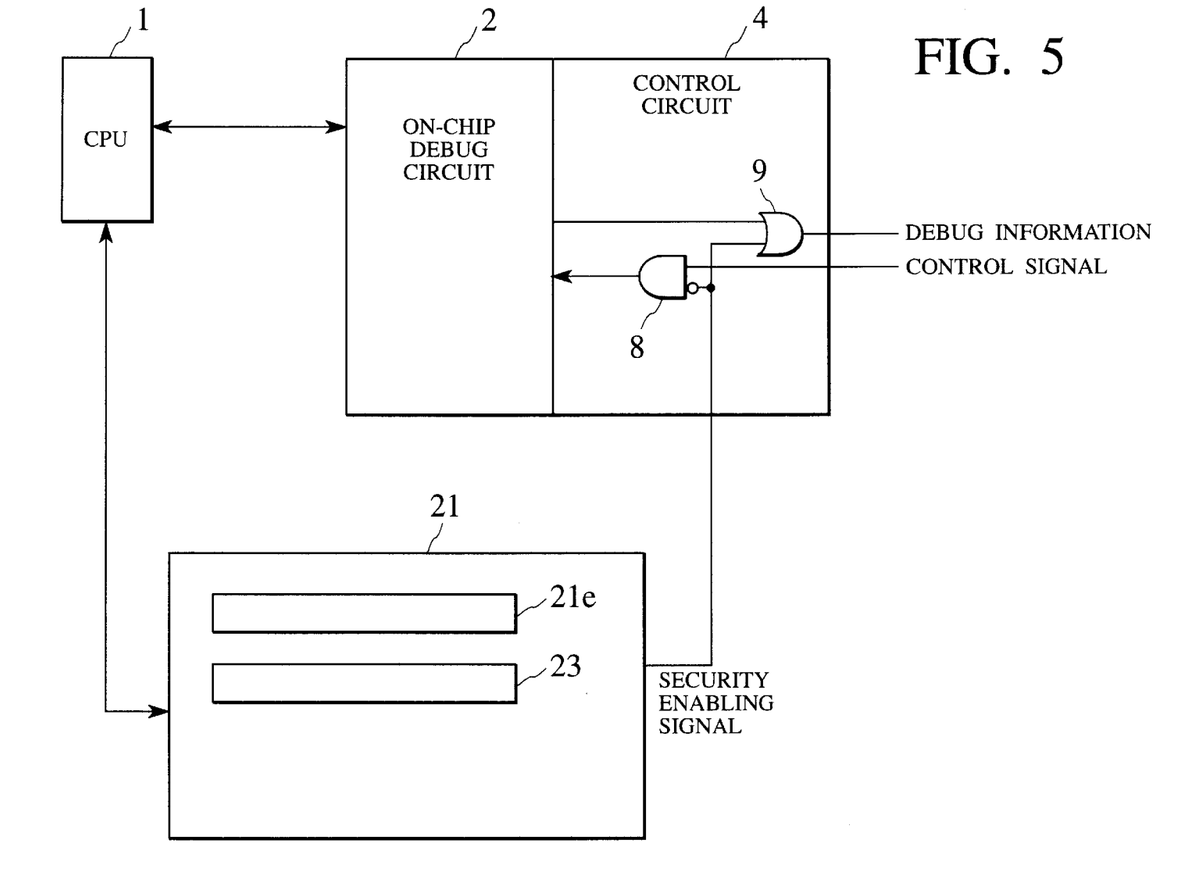
FIG. 5 is a schematic diagram for illustrating the major constituent elements of the information processing system in accordance with a second embodiment of the present invention.

Next, a second embodiment of the present invention will be explained with reference to FIG. 5.

In the case of this embodiment, the information processing system is provided with the password judgment circuit in place of the security circuit 3 as illustrated in FIG. 3. When receiving a power-on reset signal, the password judgment circuit 21 serves to disable the function of the on-chip debug circuit 2 by enabling the security mechanism in order to inhibit the operation of reading any data stored in memories.

When a registration code given from the hardware design configuration is compared with the password as inputted and confirmed the agreement therewith by means of hardwired control, the security signal is turned off to enable the function of the on-chip debug circuit 2 by disabling the security mechanism, and enabling the operation of reading the data stored in memories, particularly in the ROM 11 by means of the on-chip debug ICE 12.

Alternatively, an unlocking program prepared by the designer of the password judgment circuit 21 is stored in the ROM 11 as a start-up code in advance in order that, when a registration code given from the hardware design configuration is compared with the password as inputted and confirmed the agreement therewith by the unlocking program, the security signal is turned off to enable the function of the on-chip debug circuit 2 by disabling the security mechanism, and enabling the operation of reading the data stored in memories, particularly in the ROM 11 by means of the on-chip debug ICE 12.

The registration code can be implemented by a substrate pattern. The substrate pattern is provided with a plurality of nodes to which the terminals of the password judgment circuit 21 are connected in order to read "1" and "0" signals from the nodes when powered on. Alternatively, the password judgment circuit 21 may be provided with an embedded EEPROM 21e to which a password has been written in advance of actually being implemented in the board of the system. On the other hand, the password judgment circuit 21 is provided with jumper pins or dip switches 23 through which the password can be inputted. The similar advantages are achieved also in this embodiment in the same manner as the first embodiment of the present invention.

Figure 6:
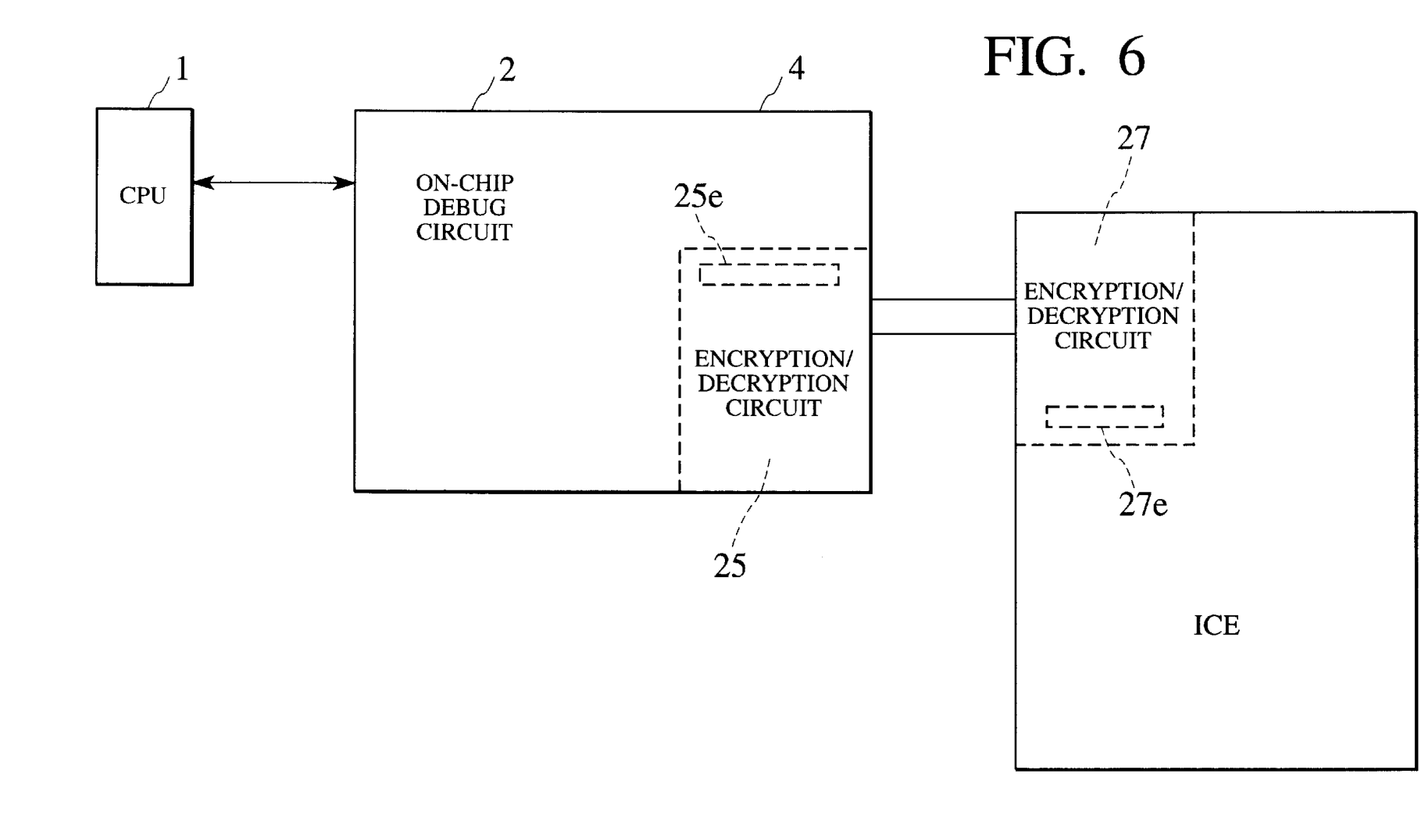
FIG. 6 is a schematic diagram for illustrating the major constituent elements of the information processing system in accordance with a third embodiment of the present invention.

The features of this embodiment is such that, while the embodiment as illustrated in FIG. 3 is implemented in order to disable all the functions of the on-chip debug circuit when the security mechanism is activated, some of the functions of the on-chip debug circuit are not disabled even when the security mechanism is activated. For example, if some debug function is effective in the user application, such a function is not disabled.

For this purpose, the on-chip debug circuit is provided with an encryption/decryption circuit 25. The on-chip debug ICE 12 is also provided with an encryption/decryption circuit 27 in the same manner. On the other hand, as one example, the on-chip debug ICE 12 may be provided with jumper pins or dip switches 27e. The encryption/decryption circuit 27 is designed in order to make use of the password as input from the jumper pins or dip switches 27e for encryption and decryption. Namely, the encryption/decryption circuit 25 serves to decrypt control signals required for enabling the debugging procedure, which control signals are encrypted and given from the on-chip debug ICE 12 to the on-chip debug circuit. In this case, some of the control signals are not encrypted in order not to disable some of the debug functions. For example, the break request can be treated always as available without a password.

The encryption key can be implemented by a substrate pattern. Namely, the substrate pattern is provided with a plurality of nodes to which the terminals of the encryption/decryption circuit 25 are connected in order to read "1" and "0" signals from the nodes when powered on. Alternatively, the encryption/decryption circuit 25 may be provided with an embedded EEPROM 25e to which a password has been written in advance of actually being implemented in the board of the system. Also, the encryption/decryption circuit 27 of the on-chip debug ICE may be provided with an embedded EEPROM in place of the jumper pins or dip switches to which a password has been written in advance of actually being implemented in the board of the system. In this case, since the password can be composed of a large number of bits, the security of the system can be furthermore enhanced and it is possible to finely set how and what debug functions are protected from reverse engineering. Optionally, when the password is composed only of zeros for example, the encryption/decryption function can be disabled so that all the debug functions are openly available.

When the security mechanism is activated, i.e., when an effective encryption key is implemented, an authorized user can implement the effective encryption key on the on-chip debug ICE in order to make use of full debug functions of the on-chip debug circuit. The similar advantages are achieved also in this embodiment in the same manner as the first embodiment of the present invention.

As explained above, in accordance with the present invention, the function of the on-chip debug circuit 2 is disabled, when receiving a power-on reset signal, in order to enable the security mechanism by aborting the operation of reading any data stored in memories, particularly in the ROM by means of the on-chip debug ICE 12, and to enable the function of the on-chip debug circuit 2 by disabling the security mechanism when an authorized person takes a predetermined procedure.

The foregoing description of preferred embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

What is claimed is:

1. An information processing system comprising:
   a ROM for storing an unlocking program and a user program;
   a CPU for executing said unlocking program and said user program stored in said ROM;
   an on-chip debug circuit serving to output debug information of said user program as executed by said information processing system; and
   a debug function disabling circuit serving to disable debug functions of said on-chip debug circuit at power up and to enable the debug functions of said on-chip debug circuit when said unlocking program has been executed.

2. The information processing system as claimed in claim 1 wherein said debug function disabling circuit is controlled by a register for controlling the security of the information processing system.

3. The information processing system as claimed in claim 2 wherein said register for controlling the security is set and reset by executing input/output instructions of said CPU.

4. The information processing system as claimed in claim 2 wherein said debug function disabling circuit is provided with a clear register, and wherein, when said register for controlling the security is set, said on-chip debug circuit is maintained disabled until said register for controlling the security is cleared an enable code is loaded to the clear register.

5. The information processing system as claimed in claim 2 wherein said debug function disabling circuit serves to disable part of the debug function(s) and enable the remaining debug function(s) at power up.

6. The information processing system as claimed in claim 5 wherein said debug function disabling circuit serves to disable, at power up, a debug function for accessing a memory, an input function for accepting a debug control signal and an output function for outputting a debug information signal.

7. The information processing system as claimed in claim 5 wherein said debug function disabling circuit serves to enable a debug function for performing break points.

8. The information processing system as claimed in claim 5 wherein, when a predetermined registration code is compared with a password as inputted to the system and confirmed the agreement therewith by said unlocking program, said debug function disabling circuit enables the function of the on-chip debug circuit.

9. An information processing system comprising:
   a ROM for storing a user program;
   a CPU for executing said user program stored in said ROM;
   an on-chip debug circuit serving to output debug information of said user program as executed by said information processing system; and
   a debug function disabling circuit serving to disable debug functions of said on-chip debug circuit at power up and to enable the debug functions of said on-chip debug circuit by authorization using a password.

10. The information processing system as claimed in claim 9 wherein the authorization using a password is performed by hardwired control.

11. The information processing system as claimed in claim 9 wherein the authorization using a password is performed by an unlocking program stored in said ROM.

12. The information processing system as claimed in claim 10 wherein said debug function disabling circuit serves to disable part of the debug function(s) and enable the remaining debug function(s) at power up.

13. The information processing system as claimed in claim 12 wherein said debug function disabling circuit serves to disable, at power up, a debug function for accessing a memory, an input function for accepting a debug control signal and an output function for outputting a debug information signal.

14. The information processing system as claimed in claim 12 wherein said debug function disabling circuit serves to enable a debug function for performing break points.

15. An information processing system comprising:

a ROM for storing a user program;

a CPU for executing said user program stored in said ROM;

an on-chip debug circuit serving to encrypt and output debug information of said user program as executed by said information processing system; and a debug function disabling circuit serving to disable debug functions of said on-chip debug circuit at power up and to enable the debug functions of said on-chip debug circuit.

16. The information processing system as claimed in claim 15 wherein said on-chip debug circuit serves to decrypt a debug control signal as given from an external on-chip debug ICE.

* * * * *